(12) United States Patent
Mukherjee et al.

(10) Patent No.: US 7,233,932 B2
(45) Date of Patent: Jun. 19, 2007

(54) FAULT DETECTION SYSTEM AND METHOD USING APPROXIMATE NULL SPACE BASE FAULT SIGNATURE CLASSIFICATION

(75) Inventors: Joydeb Mukherjee, Bangalore (IN); Venkataramana B. Kini, Bangalore (IN); Sunil K. Menon, Golden Valley, MN (US); Dinkar Mylaraswamy, Saint Anthony, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/362,426

(22) Filed: Feb. 23, 2006

(65) Prior Publication Data

US 2007/0005528 A1 Jan. 4, 2007

Related U.S. Application Data

(60) Provisional application No. 60/686,484, filed on May 31, 2005.

(51) Int. Cl.
*G06N 5/00* (2006.01)
(52) U.S. Cl. ..................................... 706/20
(58) Field of Classification Search ................. 706/20, 706/45, 25; 704/271; 194/317
See application file for complete search history.

(56) References Cited

U.S. PATENT DOCUMENTS

| | | | | |
|---|---|---|---|---|
| 5,377,305 A | | 12/1994 | Russo | |
| 5,442,729 A | * | 8/1995 | Kramer et al. | 704/271 |
| 5,455,892 A | * | 10/1995 | Minot et al. | 706/25 |
| 5,479,571 A | * | 12/1995 | Parlos et al. | 706/25 |
| 5,485,908 A | * | 1/1996 | Wang et al. | 194/317 |
| 6,868,325 B2 | | 3/2005 | Menon et al. | |
| 2005/0096873 A1 | | 5/2005 | Klain | |

FOREIGN PATENT DOCUMENTS

| | | |
|---|---|---|
| EP | 1363005 A2 | 11/2003 |
| EP | 06114570 | 10/2006 |

OTHER PUBLICATIONS

Tolani, et al, Anomaly detection for health management of aircraft gas turbine engines, American Control Conference, 2005, Proceedings of the 2005, Jun. 8-10, 2005, vol. 1, pp. 459-464.*

(Continued)

*Primary Examiner*—Wilbert L. Starks, Jr.
(74) *Attorney, Agent, or Firm*—Ingrassia Fisher & Lorenz

(57) ABSTRACT

A system and method for fault detection is provided. The fault detection system provides the ability to detect symptoms of fault in turbine engines and other mechanical systems that have nonlinear relationships between two or more variables. The fault detection system uses a neural network to perform feature extraction from data for representation of faulty or normal conditions. The values of extracted features, referred to herein as scores, are then used to determine the likelihood of fault in the system. Specifically, the lower order scores, referred to herein as "approximate null space" scores can be classified into one or more clusters, where some clusters represent types of faults in the turbine engine. Classification based on the approximate null space scores provides the ability to classify faulty or nominal conditions that could not be reliably classified using higher order scores.

20 Claims, 5 Drawing Sheets

OTHER PUBLICATIONS

Menon, S., et al., Startup Fault Detection and Diagnosis in Turbine Engines, Proc IEEE Aerospace Conference, vol. 7, Mar. 8, 2003, p. 3069-3074.
U.S. Appl. No. 10/379,413, filed Mar. 3, 2003, Uluyol.
U.S. Appl. No. 11/288,818, filed Nov. 28, 2005, Foslien et al.
U.S. Appl. No. 11/165,985, filed Jun. 24, 2005, Mukherjee et al.
Mark A. Kramer, Nonlinear Principal Component Analysis Using Autoassociative Neural Networks, AIChE Journal, Feb. 1991, 11 pages, vol. 37, No. 2, Cambridge, Massachusetts.
Namrata Vaswani and Rama Chellappa, Classification Probablity Analysis of Principal Component Null Space Analysis, University of Maryland, 4 pages, College Park, Maryland.
Leon French, Alioune Ngom, and Luis Rueda, Fast Protein Superfamily Classification using Principal Component Null Space Analysis, University of Windsor, 12 pgs Windsor, Onterio.
Namrata Vaswani and Rama Chellappa, Principal Components Null Space Analysis for Image and Video Classification, University of Maryland, 30 pages, College Park, Maryland.

* cited by examiner

FAULT DETECTION SYSTEM AND METHOD USING APPROXIMATE NULL SPACE BASE FAULT SIGNATURE CLASSIFICATION

CROSS-REFERENCES TO RELATED APPLICATION

This application claims the benefit of U.S. Provisional Application No. 60/686,484, filed May 31, 2005.

FIELD OF THE INVENTION

This invention generally relates to diagnostic systems, and more specifically relates to fault detection under both transient and steady-state conditions.

BACKGROUND OF THE INVENTION

Modern aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such, fault detection for aircraft engines are an important part of an aircraft's fault detection system. Some traditional engine fault detection has been limited to methods of fault detection that are based on linear relationships between variables in the system. While these methods have been effective in detecting some faults, they are less effective in detecting faults in systems where there are significant nonlinearities in the system. Many complex systems, such as turbine engines, have substantially nonlinear relationships between variables in the system. In these types of system, the nonlinear relationship between variables reduces the effectiveness of these linear techniques for fault detection.

Thus, what is needed is an improved system and method for fault detection that is able to detect and classify fault in systems with nonlinear relationships among variables or observed measurements.

BRIEF SUMMARY OF THE INVENTION

The present invention provides an improved fault detection system and method. The fault detection system provides the ability to detect symptoms of fault in turbine engines and other mechanical systems that have nonlinear relationships between two or more variables. The fault detection system uses a neural network to perform feature extraction from data for representation of faulty or normal conditions. The values of extracted features, referred to herein as scores, are then used to determine the likelihood of fault in the system. The features are arranged in descending order of their ability to explain variance present in the data and the scores which explain lesser magnitudes of variance present in the data will henceforth be referred to as "lower order scores". Specifically, the lower order scores, referred to herein as "approximate null space" scores can be classified into one or more clusters, where some clusters represent types of faults in the turbine engine. Classification based on the approximate null space scores provides the ability to classify faulty or nominal conditions that could not be reliably classified using higher order scores. Thus, the system is able to reliably detect and classify faults in situations where other techniques cannot.

In one embodiment the fault detection system includes a chain of encoding neural networks and decoding neural networks. The chain of encoding neural networks and decoding neural networks receives sensor data from the turbine engine and performs a principal component-type analysis to create a reduced feature space data representation of the sensor data. Specifically, the first encoding neural network receives the sensor data and generates a score, where the score is analogous to a first principal component. The first decoding neural network receives the score from the first encoding neural network and outputs reconstructed estimate of the sensor data. The reconstructed estimate of the sensor data is subtracted from the sensor data to create a sensor data residual, which is passed to the second encoding neural network. The second encoding neural network generates a second score, where the second score is analogous to a second principal component. The second decoding neural network receives the second score from the second decoding neural network and outputs reconstructed estimate of the sensor data residual. The reconstructed estimate of the sensor data residual is subtracted from the original sensor data residual to create a second sensor data residual, which is passed to the next encoding neural network. The chain of encoding neural networks and decoding neural networks continues, creating a plurality N of scores, a sensor data estimate, and N−1 residual estimates.

So implemented, the plurality of generated scores can be used for fault detection and classification. Specifically, the lower order scores can be used to classify the sensor data into one or more clusters, where some clusters represent types of faults in the turbine engine. In one embodiment, classification is accomplished by passing the approximate null space scores to one or more discriminant functions. The discriminant functions each represent a type of behavior in the system, such as a properly performing system, or a specific type of fault in the system. When the null space scores are inputted in the discriminant function, the output of the discriminant function will indicate which side of a decision boundary the scores reside on, and thus whether the scores are in a good engine cluster, or in a particular bad engine cluster. Thus, the output of the discriminant functions is used to accurately classify the performance of the turbine engine.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a fault detection system and method. The fault detection system provides the ability to detect symptoms of fault in turbine engines and other mechanical systems that have nonlinear relationships among variables describing the system. The fault detection system uses a neural network to perform a data representation and feature extraction where the extracted features are analogous to eigen vectors derived from eigen decomposition of the covariance matrix of the data. The extracted features, referred to herein as scores, are then used to determine the likelihood of fault in the system. Specifically, the lower order scores, referred to herein as "approximate null space" scores can form one or more clusters, where some clusters represent types of faults in the turbine engine. Classification based on the approximate null space scores provides the ability to classify fault signatures that could not be reliably classified using higher order scores. Thus, the system is able to reliably detect and classify faults in situations where other techniques cannot.

Figure 1:
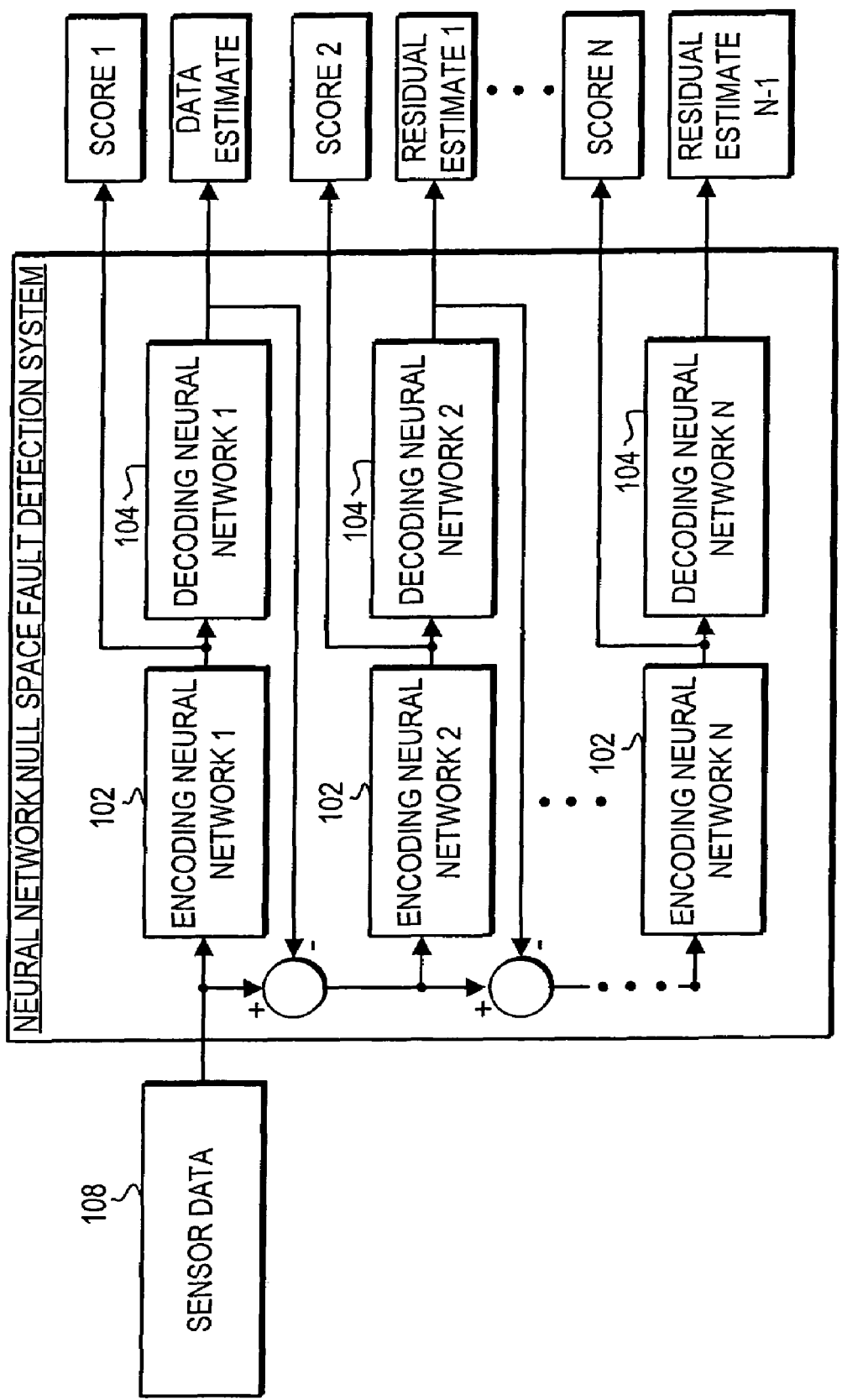
FIG. 1 is a schematic view of an approximate null space neural network fault detection system in accordance with an embodiment of the invention.

Turning now to FIG. 1, a neural network null space fault detection system 100 is illustrated. The neural network null space fault detection system 100 includes a chain of encoding neural networks 102 and decoding neural networks 104. The chain of encoding neural networks 102 and decoding neural networks 104 receives sensor data from the system being monitored, such as a turbine engine, and performs a principal component-type analysis to create a reduced feature space data representation of the sensor data. Specifically, the sensor data is passed to the first encoding neural network 102 (labeled encoding neural network 1). The first encoding neural network 102 receives the sensor data and generates a score (score 1), where the score is analogous to a first principal component. The first decoding neural network 104 (labeled decoding neural network 1) receives the score from the first encoding neural network 102 and outputs reconstructed estimate of the sensor data. The reconstructed estimate of the sensor data is subtracted from the sensor data to create a sensor data residual, which is passed to the second encoding neural network 102. The second encoding neural network 102 generates a second score (score 2), where the second score is analogous to a second principal component. The second decoding neural network 104 receives the second score from the second encoding neural network and outputs a reconstructed estimate of the sensor data residual (residual estimate 1). The reconstructed estimate of the sensor data residual is subtracted from the original sensor data residual to create a second sensor data residual, which is passed to the next encoding neural network 102. The chain of encoding neural networks 102 and decoding neural networks 104 continues, creating a plurality N of scores, a sensor data estimate, and N-1 residual estimates.

It should be noted that the neural network fault detection system 100 uses a feed forward neural network. These feed forward neural networks can be trained using supervised techniques that use a target value, an actual output value, and some function of the difference between the two as error.

So implemented, the plurality of generated scores can be used for fault detection and classification. Specifically, the lower order scores, referred to herein as "approximate null space" scores can be used to classify the sensor data into one or more clusters, where some clusters represent types of faults in the turbine engine. Classification based on the approximate null space scores provides the ability to classify faults that could not be reliably classified using higher order scores.

Specifically, when the total variance is high and the variance in individual clusters is low, the major components (i.e., higher order scores) may be enough to provide separation of different classes. However, in other cases the major components by themselves will be insufficient to reliably classify the behavior. In those cases, the lower order components, called the "approximate null space scores" are particularly useful for classifying faults because they can be used to effect separation of points among several clusters when it would not be reliably possible relying only on major components.

Scores corresponding to the nonlinear components which include a larger proportion of variance present in the data help in segregating different classes. For example, assuming that total variance of all the data (pooling the different classes together) is high and the variance of the individual clusters are low, major components are typically sufficient for separation of whole cluster of points. However, in the case when this is not the situation the minor components can be used to effect separation of most of the points among several clusters.

It should be noted that the distinction between major components and minor components, i.e., the line between higher order scores and approximate null space scores would depend upon the details of the application. Additionally, several different methods can be used to determine what approximate null space scores can be used for classification. For example, by determining the "intrinsic dimensionality" of the nonlinear data. In this case the scores beyond the intrinsic dimension of all components are minor, approximate null space scores.

In one embodiment, the lower order scores are classified using a "discriminant" method. In a discriminant based method the borders between clusters are determined and new scores are classified by determining what side of the borders the scores reside on. The approximate null space scores include discrimination features which are particularly useful in building discriminant functions. Thus, the approximate null space scores can be used to help in segregating not only the cluster centroids in the score space but also most of the points belonging to two or more different classes.

The use of a discriminant based method offers some advantages over "representation" based techniques. Specifically, in representation based techniques classification is done by capturing the best representation for each cluster in the space of scores. While representation based techniques may work for some classification problems they cannot be used in all applications.

Figure 2:
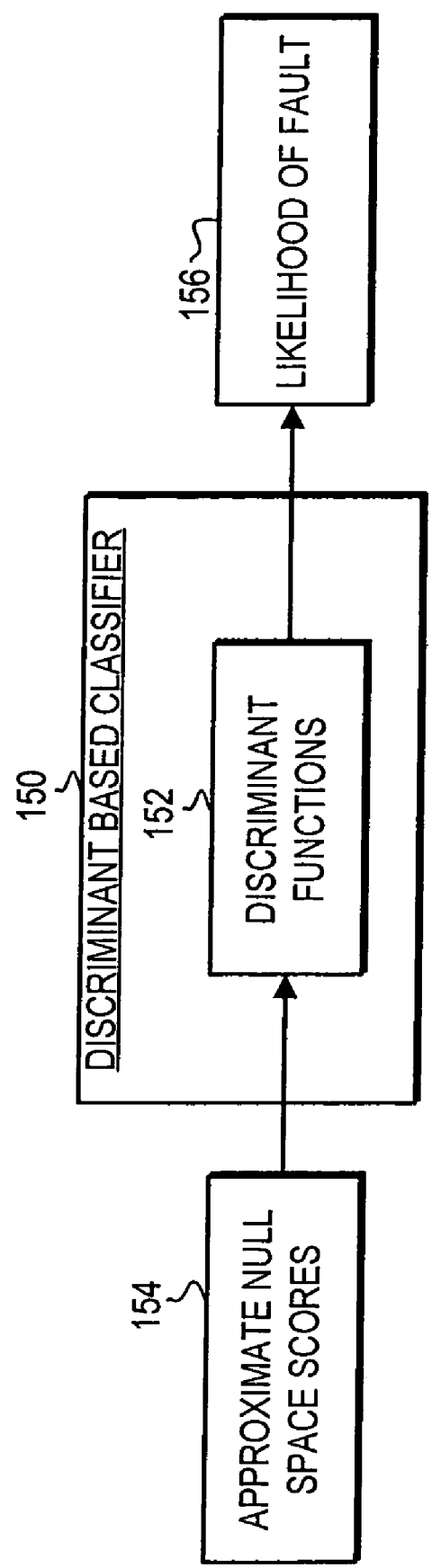
FIG. 2 is a schematic view of a discriminant based classifier in accordance with one exemplary embodiment.

As stated above, the approximate null space scores are particularly useful for classifying faults because they can be used to effect separation of points among several clusters when it would not be reliably possible relying only on major components. This facilitates the use of a discriminant based classification technique. In one embodiment, classification is accomplished by passing the approximate null space scores to one or more discriminant functions. Turning now to FIG. 2, an exemplary discriminant feature based classifier 150 in accordance with an embodiment of the invention is illustrated. The discriminant feature based classifier 150 uses one or more discriminant functions 152 to classify the approximate null space scores 154 generated by the neural network fault detection system. The classification of the scores is used to generate a likelihood of fault 156, which can then be passed to a diagnostic system for further evaluation.

The discriminant functions 152 each represent a type of behavior in the system, such as a properly performing system, or a specific type of fault in the system. Specifically, the discriminant functions capture the characteristics of the separating boundaries between types of score clusters. When the approximate null space scores 154 are inputted in the discriminant function 152, the output of the discriminant function 152 will indicate which side of a decision boundary the scores reside on, and thus whether the scores are in a good engine cluster, or a bad engine cluster.

A variety of different techniques can be used to develop the discriminant functions used for classification. In one method, the discriminant functions are developed using artificial neural networks (ANN). Using an ANN technique, discriminant functions can be developed for each different cluster of scores. Specifically, ANN is used to capture the characteristics of the decision, or separating boundaries between and among the various classes of scores. In doing so, the ANN considers the characteristics of the clusters that share common boundaries. Thus, the features that represent the boundaries between clusters are discovered, and can be any line, plane, or curved surface in the feature space.

Figure 5:
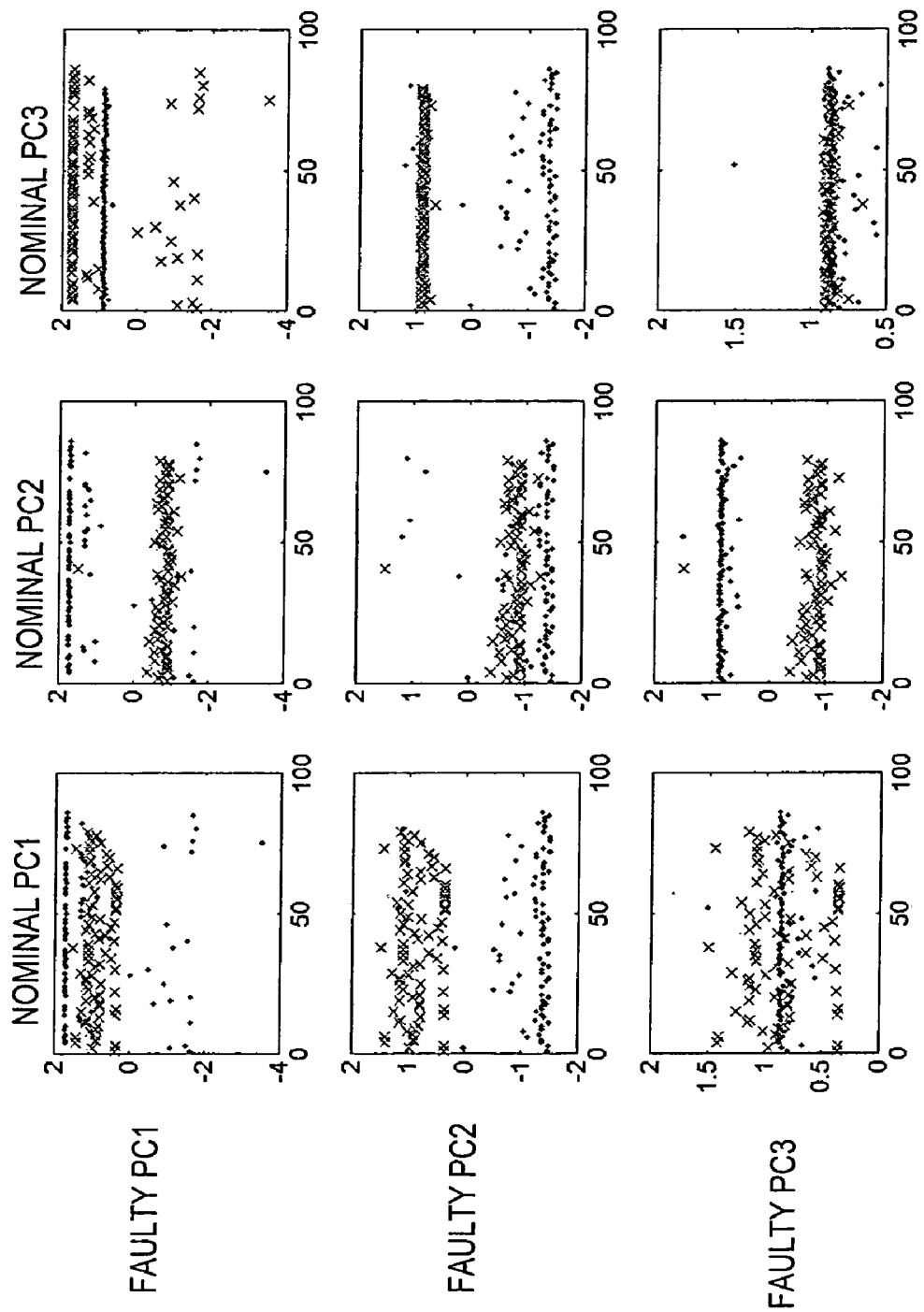
FIG. 5 are graphical views of exemplary score clusters.

Thus, when developed, new scores for the neural network null space fault detection system can be inputted into the discriminant functions. The resulting output (e.g., positive or negative) indicates which side of the corresponding decision boundary that score is in. Thus, by inputting the score into an appropriate set of discriminant functions, the cluster of the score can be determined. A typical discriminant function corresponding to a class usually has features for that class alone as parameters. In contrast, a discriminant function can utilized which uses features from all the classes as parameters. This affords greater discrimination power to the classifier developed. Turning briefly to FIG. 5, in one illustrated embodiment new data points are classified based on a weighted distance measure based on their relative discrimination abilities. Specifically, FIG. 5 illustrates graphical representations for nine combinations of approximate null space scores from faulty turbine engines (Faulty PC1, Faulty PC2, Faulty PC3), with the clusters represented by crosses, and approximate null space scores for nominal turbine engines (Nominal PC1, Nominal PC2, Nominal PC3), with the clusters represented by dots. The separation between clusters can be used to classify the scores in those clusters. As can be seen from these graphs, some combination of features (e.g., Faulty PC3 and Nominal PC1; Faulty PC2 and Nominal PC2; and Faulty PC3 and Nominal PC1) have very poor discrimination power whereas other combinations of features (e.g., Faulty PC2 and Nominal PC1; Faulty PC3 and Nominal PC2; and Faulty PC2 and Nominal PC3) have very high discrimination power. Thus, while constructing discriminant functions for each of the two classes, namely, Nominal and Faulty, the latter set of mixed features will have higher weightage as opposed to the former set of mixed features, which may even have zero weightage associated with them New class detection can be provided for cases where projection lengths onto two or more different classification directions are not significantly different. Specifically, if the magnitude of distances from two or more classes is less than a threshold, then it can be determined that the difference between the distances is not "statistically significant". In those cases, the new data is assumed to belong to a "new" class.

To create a null space fault detection system, a set of training data would typically be used. The training data would be split into nominal training, nominal testing, faulty training and faulty testing data. The training data would then be normalized and used to train the neural network fault detector. Lower end components, such as the three trailing components, can then be taken and used as null space directions. The classification error for different combinations of null space components can be found, and based on these classification errors the discriminatory weights for the neural network. Normalized test data can then be used to find the null space components for the test data. The principal components can then be weighted, and their weights used to assign a class label based on the least distance from a particular class cluster.

Figure 3:
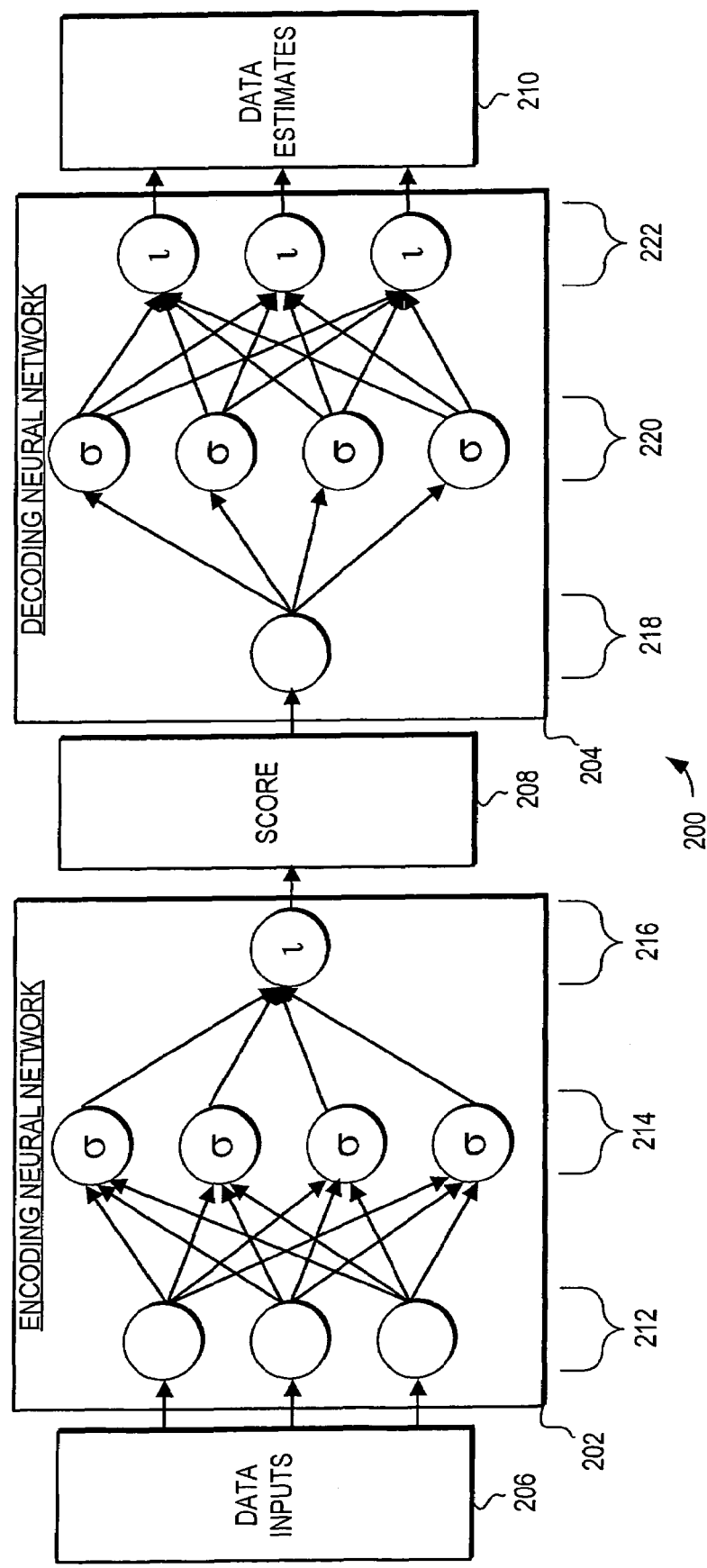
FIG. 3 is a schematic view of a encoding and decoding network in accordance with one exemplary embodiment.

Turning now to FIG. 3, an exemplary embodiment of a neural network fault detector 200 is illustrated schematically. The neural network fault detector 200 includes an encoding neural network 202 and a decoding neural network 204. The encoding neural network 202 and a decoding neural network 204 are examples of type of neural networks that can be used in the chain of neural networks illustrated in FIG. 1.

In general, neural networks are data processing systems that are not explicitly programmed. Instead, neural networks are trained through exposure to real-time or historical data. Neural networks are characterized by powerful pattern matching and predictive capabilities in which input variables interact heavily. Through training, neural networks learn the underlying relationships among the input and output variables, and form generalizations that are capable of representing any nonlinear function. As such, neural networks are a powerful technology for nonlinear, complex classification problems.

The encoding neural network 202 receives data inputs 206. For the first encoding neural network this would comprise sensor data from the system being monitored, such as from a turbine engine. In some embodiments the sensor data comprises raw sensor data. In other embodiments, the sensor data is preprocessed using a suitable technique. For example, the sensor data can be preprocessed by passing through a semi-empirical polynomial model of the system to correct and normalize them for varying operating conditions and to account for system specific idiosyncrasies. For later encoding neural networks, the data inputs would comprise residuals created by subtracted estimates from previous values.

The encoding neural network 202 performs a principal component-type analysis to create a reduced feature space data representation of the sensor data 206. The reduced feature space data representation is in the form of a score 208, where the score 208 is analogous to principal components. Thus, the score generated by the first encoding neural network in the chain is analogous to the first principal component, the score generated by the second encoding neural network is analogous to the second principal component, and so on.

The score 208 is passed to a corresponding decoding neural network 204. The decoding neural network 204 receives the score, and outputs reconstructed estimate. The output of the first decoding neural network will comprise a reconstructed estimate of the sensor data, and outputs of later decoding neural networks will comprise reconstructed estimates of residuals.

In the illustrated embodiment, both the encoding neural network 202 and the decoding neural network 204 comprise multi-layered feed-forward neural networks. Specifically, the encoding neural network 202 comprises an input layer 212, a mapping layer 214 and an output layer 216. The decoding neural network 204 likewise comprises an input layer 218, a demapping layer 218 and an output layer 222. Each of these layers includes a plurality of nodes, with each node having a corresponding activation function. Typically, the number of nodes in each layer would depend upon a variety of factors. For example, the number of nodes in the input layer 212 of the encoding neural network 202 would typically be equal to the number of sensors providing data. For example, in a turbine engine system that provides ten different sensor data measurements during each event, the input layer of the encoding neural network 202 would include ten nodes.

The one node in the output layer 216 of the encoding neural network 202 corresponds to scores generated by the neural network. Taken together, the scores generated by each of the encoding neural networks in the chain are a reduced feature space data representation of the sensor data, and are analogous to principal components.

Both the mapping layer 214 and demapping layer 220 would typically have a larger number of nodes than the input layer. This is to ensure good generalization and prevents the network from forming a look-up table.

Each node in the encoding and decoding neural network includes an activation function. Specifically, each node takes weighted combinations of the node inputs and applies it to an activation function to produce some output, which is then passed to other nodes in the network. To facilitate data representation of nonlinear relationships in the sensor data, the nodes of the mapping layer 214 and demapping layer 220 would typically have nonlinear activation functions. Nonlinear activation functions produce a nonlinear output. The use of nonlinear activation functions facilitates the modeling of nonlinear data distributions. As one example, the nonlinear activation function can comprise a sigmoidal activation function. Specifically, the nonlinear activation function $\sigma(y)$ can be defined as:

$$\sigma(y) = \frac{1}{1 + \exp(-y + \theta)} \text{ where, } \quad \text{Equation 1}$$

$$y = \sum_{i=1}^{n} x_i w_i \text{ and } \theta \text{ is bias.}$$

In most embodiments, the output layer 216 and output layer 222 do not require nonlinear activation functions. In these layers, a more typical linear activation function can be used. For example, a linear activation function $\sigma(y)$ can be defined as:

$$\sigma(y) = y \text{ where, } y = \sum_{i=1}^{n} x_i w_i \text{ and } \theta \text{ is bias.} \quad \text{Equation 2}$$

Again, it should be noted that the number of layers, and the number of nodes in each layer illustrated in the neural network fault detector 200 is merely exemplary, and that in other embodiments the number of nodes and number of layers could differ significantly from the illustrated example.

Each node in the neural network has an associated weight or weight vector. Training the neural network determines the weights associated with each node in the network. The neural network is trained for fault detection using sets of historical sensor data. When so trained, the neural network is used for fault detection by inputting new sensor data into neural network and comparing new sensor data to the reconstructed estimates. Additionally, the neural network can be used for fault detection by classifying the scores output from the encoding network. In this embodiment, the scores are classified by comparing the scores from new sensor data with scores generated from historical sensor data during training.

When the encoding and decoding networks are so trained and tested, the neural network can effectively detect faults in systems with nonlinear relationships between data. Specifically, when so trained with historical data that includes nonlinear relationships, the resulting network will be able to extract features for fault detection capitalizing on the nonlinear relationships among input sensor data. These features are extracted in the form of scores, which can then be used to determine if there is a fault in the mechanical system.

Figure 4:
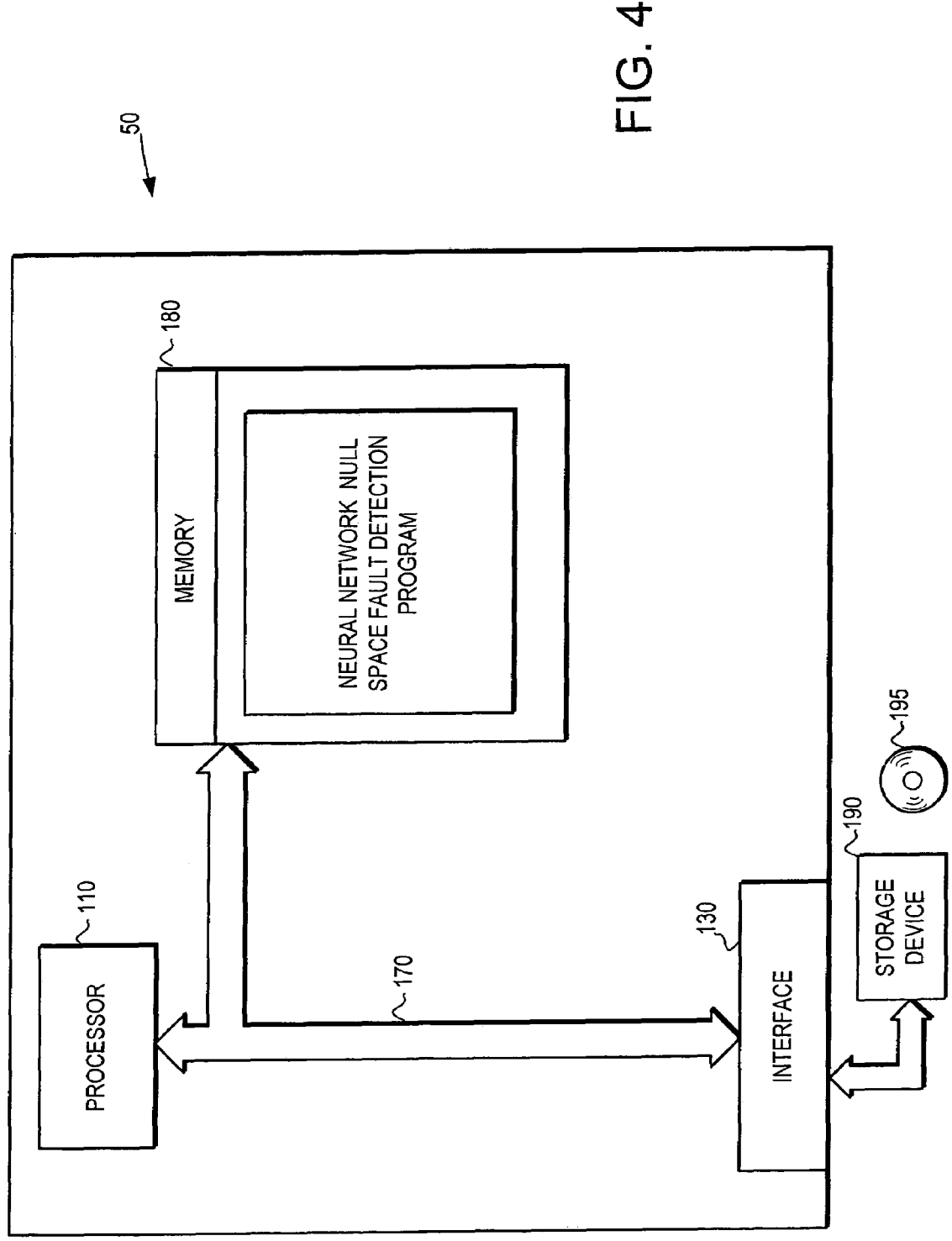
FIG. 4 is a schematic view of a computer system that includes a neural network fault detection program.

The neural network null space fault detection system and method can be implemented in wide variety of platforms. Turning now to FIG. 4, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 10, an interface 130, a storage device 190, a bus 170 and a memory 180. In accordance with the preferred embodiments of the invention, the memory system 50 includes a neural network null space fault detection program.

The processor 110 performs the computation and control functions of the system 50. The processor 110 may comprise any type of processor, including single integrated circuits such as a microprocessor, or may comprise any suitable number of integrated circuit devices and/or circuit boards working in cooperation to accomplish the functions of a processing unit. In addition, processor 10 may comprise multiple processors implemented on separate systems. In addition, the processor 10 may be part of an overall vehicle control, navigation, avionics, communication or diagnostic system. During operation, the processor 10 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 3, storage device 190 can comprise a disc drive device that uses discs 195 to store data.

In accordance with the preferred embodiments of the invention, the computer system 50 includes the neural network null space fault detection program. Specifically during operation, the neural network null space fault detection program is stored in memory 180 and executed by processor 110. When being executed by the processor 110, the neural network fault detection system monitors operation parameters to identify potential faults.

As one example implementation, the neural network fault detection system can operate on data that is acquired from the system (e.g., turbine engine) and periodically uploaded to an internet website. The neural network analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of computer-readable signal bearing media include: recordable media such as floppy disks, hard drives, memory cards and optical disks (e.g., disk 195), and transmission media such as digital and analog communication links.

Thus, various embodiments of the present invention thus provide a fault detection system and method detection system provides the ability to detect symptoms of fault in turbine engines and other mechanical systems that have nonlinear relationships. Specifically, the fault detection system includes a chain of encoding neural networks and decoding neural networks. The chain of encoding neural networks and decoding neural networks receives sensor data from the turbine engine and performs a principal component-type analysis to create a reduced feature space data representation of the sensor data. Specifically, the first encoding neural network receives the sensor data and generates a score, where the score is analogous to a first principal component. So implemented, the plurality of generated scores can be used for fault detection and classification. The lower order scores, referred to herein as "approximate null space" scores can be classified into one or more clusters, where some clusters represent types of faults in the turbine engine. Classification based on the approximate null space scores provides the ability to classify scores that could not be reliably classified using higher order scores. Thus, the system is able to reliably detect and classify faults in situations where other techniques cannot.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the fault detection system comprising:
   a neural network system, the neural network system adapted to receive sensor data from the turbine engine and generate a plurality of approximate null space scores that represent discrimination features in the sensor data; and
   a discriminant based classifier, the discriminant based classifier adapted to receive the approximate null space scores and classify the approximate null space scores to determine a likelihood of fault in the turbine engine.

2. The system of claim 1 wherein the neural network system comprises a chain of neural networks, each of the chain of neural networks adapted to generate a score from the sensor data, and wherein a subset of the chain of neural networks are adapted to generate the plurality of approximate null space scores.

3. The system of claim 1 wherein the neural network system comprises a chain of neural networks, and wherein each of the chain of neural networks includes an encoding neural network and a corresponding decoding neural network, wherein each encoding neural network creates a score from the sensor data, each score comprising a reduced feature space representation of the sensor data; and wherein each decoding neural network receives the score from the corresponding encoding neural network and creates an estimate of the sensor data, wherein the estimate of the sensor data is passed to the next encoding network in the chain of neural networks.

4. The system of claim 1 wherein the discriminant based classifier comprises a plurality of discriminant functions, each discriminant function capturing characteristics of a boundary between score clusters.

5. The system of claim 4 wherein the plurality of discriminant functions comprises discriminant functions developed using an artificial neural network.

6. The system of claim 4 wherein the discriminant based classifier determines which side of the boundary between score clusters the approximate null space scores are on to classify the approximate null space scores.

7. The system of claim 4 wherein the discriminant based classifier determines a new cluster exists when a magnitude of a distance from the projected point in the approximate null space to two or more classes are not statistically significantly different.

8. A method of detecting fault in a turbine engine, the method comprising the steps of:
   receiving sensor data from the turbine engine;
   generating a plurality of approximate null space scores from the sensor data, the plurality of approximate null space scores representing discrimination features in the sensor data; and
   classifying the null space scores based on discrimination to determine a likelihood of fault in the turbine engine.

9. The method of claim 8 wherein the step of generating a plurality of approximate null space scores comprises generating the plurality of approximate null space scores using a chain of neural networks.

10. The method of claim 9 wherein each of the chain of neural networks comprises step of generating a plurality of approximate null space scores comprises an encoding neural network and a corresponding decoding neural network.

11. The method of claim 8 wherein the step of classifying the null space scores based on discrimination to determine a likelihood of fault in the turbine engine comprises using a plurality of discriminant functions, each of plurality of discriminant functions capturing characteristics of a boundary between score clusters.

12. The method of claim 11 wherein the plurality of discriminant functions comprises discriminant functions developed using an artificial neural network.

13. The method of claim 8 wherein the step of classifying the null space scores based on discrimination to determine a likelihood of fault in the turbine engine comprises determining which side of a boundary between score clusters the approximate null space scores are on.

14. A program product comprising:
a) a fault detection program, the fault detection program including:
  a neural network system, the neural network system adapted to receive sensor data from a turbine engine and generate a plurality of approximate null space scores that represent discrimination features in the sensor data; and
  a discriminant based classifier, the discriminant based classifier adapted to receive the approximate null space scores and classify the approximate null space scores to determine a likelihood of fault in the turbine engine; and
b) computer-readable signal bearing media bearing said program.

15. The program product of claim 14 wherein the neural network system comprises a chain of neural networks, each of the chain of neural networks adapted to generate a score from the sensor data, and wherein a subset of the chain of neural networks are adapted generate the plurality of approximate null space scores.

16. The program product of claim 14 wherein the neural network system comprises a chain of neural networks, and wherein each of the chain of neural networks includes an encoding neural network and a corresponding decoding neural network, wherein each encoding neural network creates a score from the sensor data, each score comprising a reduced feature space representation of the sensor data; and wherein each decoding neural network receives the score from the corresponding encoding neural network and creates an estimate of the sensor data, wherein the estimate of the sensor data is passed to the next encoding network in the chain of neural networks.

17. The program product of claim 14 wherein the discriminant based classifier comprises a plurality of discriminant functions, each discriminant function capturing characteristics of a boundary between score clusters.

18. The program product of claim 17 wherein the plurality of discriminant functions comprises discriminant functions developed using an artificial neural network.

19. The program product of claim 17 wherein the discriminant based classifier determines which side of the boundary between score clusters the approximate null space scores are on to classify the approximate null space scores.

20. The program product of claim 17 wherein the discriminant based classifier determines a new cluster exists when a magnitude of a distance from the projected point in the approximate null space to two or more classes are not statistically significantly different.

* * * * *